US011954902B2

(12) United States Patent
De Fauw et al.

(10) Patent No.: US 11,954,902 B2
(45) Date of Patent: Apr. 9, 2024

(54) GENERALIZABLE MEDICAL IMAGE ANALYSIS USING SEGMENTATION AND CLASSIFICATION NEURAL NETWORKS

(71) Applicant: Google LLC, Mountain View, CA (US)

(72) Inventors: Jeffrey De Fauw, London (GB); Joseph R. Ledsam, Tokyo (JP); Bernardino Romera-Paredes, London (GB); Stanislav Nikolov, London (GB); Nenad Tomasev, London (GB); Samuel Blackwell, London (GB); Harry Askham, London (GB); Xavier Glorot, Montréal (CA); Balaji Lakshminarayanan, Sunnyvale, CA (US); Trevor Back, Saffron Walden (GB); Mustafa Suleyman, London (GB); Pearse A. Keane, London (GB); Olaf Ronneberger, London (GB); Julien Robert Michel Cornebise, London (GB)

(73) Assignee: Google LLC, Mountain View, CA (US)

( * ) Notice: Subject to any disclaimer, the term of this patent is extended or adjusted under 35 U.S.C. 154(b) by 244 days.

(21) Appl. No.: 17/114,586

(22) Filed: Dec. 8, 2020

(65) Prior Publication Data

US 2021/0118198 A1 Apr. 22, 2021

Related U.S. Application Data

(63) Continuation of application No. 16/236,045, filed on Dec. 28, 2018, now Pat. No. 10,878,601, which is a
(Continued)

(51) Int. Cl.
*G06V 10/82* (2022.01)
*G06F 18/21* (2023.01)
(Continued)

(52) U.S. Cl.
CPC ............ *G06V 10/82* (2022.01); *G06F 18/217* (2023.01); *G06F 18/24133* (2023.01);
(Continued)

(58) Field of Classification Search
CPC ................. G06T 11/003; G06T 7/0012; G06T 2207/20084; G06K 9/6262
See application file for complete search history.

(56) References Cited

U.S. PATENT DOCUMENTS

| 5,245,672 A | 9/1993 | Wilson |
| 5,247,584 A | 9/1993 | Krognnann |

(Continued)

FOREIGN PATENT DOCUMENTS

| CN | 105640577 A | 6/2016 |
| CN | 106372390 A | 2/2017 |

(Continued)

OTHER PUBLICATIONS

ElTanboly (A computer-aided diagnostic system for detecting diabetic retinopathy in optical coherence tomography images, Medical Physics 2016) (Year: 2016).*

(Continued)

*Primary Examiner* — Mark Roz
(74) *Attorney, Agent, or Firm* — Fish & Richardson P.C.

(57) ABSTRACT

Methods, systems, and apparatus, including computer programs encoded on a computer storage medium, for generating a final classification output for an image of eye tissue. The image is provided as input to each of one or more segmentation neural networks to obtain one or more segmentation maps of the eye tissue in the image. A respective classification input is generated from each of the segmentation maps. For each of the segmentation maps, the classification input for the segmentation map is provided as input to each of one or more classification neural networks
(Continued)

a) DIGITAL OCT SCAN c) TISSUE SEGMENTATION MAP d) REFERRAL AND CONDITION SCORES to obtain, for each segmentation map, a respective classification output from each classification neural network. A final classification output for the image is generated from the respective classification outputs for each of the segmentation maps.

19 Claims, 6 Drawing Sheets

Related U.S. Application Data continuation of application No. 16/022,170, filed on Jun. 28, 2018, now Pat. No. 10,198,832.

(60) Provisional application No. 62/586,822, filed on Nov. 15, 2017, provisional application No. 62/526,293, filed on Jun. 28, 2017.

(51) Int. Cl.
    G06F 18/2413    (2023.01)
    G06F 18/25      (2023.01)
    G06T 7/00       (2017.01)
    G06T 11/00      (2006.01)
    G06V 10/44      (2022.01)
    G06V 10/764     (2022.01)
    G06V 10/80      (2022.01)

(52) U.S. Cl.
    CPC .......... *G06F 18/254* (2023.01); *G06T 7/0012* (2013.01); *G06T 11/003* (2013.01); *G06V 10/454* (2022.01); *G06V 10/764* (2022.01); *G06V 10/809* (2022.01); *G06T 2207/10101* (2013.01); *G06T 2207/20081* (2013.01); *G06T 2207/20084* (2013.01); *G06T 2207/30041* (2013.01); *G06V 2201/03* (2022.01)

(56) References Cited

U.S. PATENT DOCUMENTS

| | | |
|---|---|---|
| 9,129,190 B1 | 9/2015 | Ranzato |
| 2010/0092064 A1 | 4/2010 | Li |
| 2012/0274898 A1 | 11/2012 | Sadda et al. |
| 2016/0242639 A1 | 8/2016 | Ehlers et al. |
| 2018/0047159 A1 | 2/2018 | Schlegl et al. |
| 2018/0132725 A1 | 5/2018 | Vogl et al. |
| 2018/0189613 A1 | 7/2018 | Wolf |

FOREIGN PATENT DOCUMENTS

| | | |
|---|---|---|
| WO | WO2014082925 A1 | 6/2014 |
| WO | WO2015154058 A1 | 10/2015 |
| WO | WO 2016/139183 | 9/2016 |
| WO | WO 2016/139189 | 9/2016 |
| WO | WO 2016/177722 | 11/2016 |

OTHER PUBLICATIONS

Liu ("Fully Convolutional Attention Networks for Fine-Grained Recognition", arXiv 2016) (Year: 2016).*
Fang (Automatic segmentation of nine retinal layer boundaries in OCT images of non-exudative AMD patients using deep learning and graph search, Biomedical Optics 2017) (Year: 2017).*
Moisseiev "The Third Dimension: Advantages of 3D-OCT in Retina", Retinal Physician, Apr. 2016 (Year: 2016).*
CN Office Action in Chinese Appln. No. 201880025979.4, dated Aug. 29, 2022, 20 pages (with English Translation).
Priya et al., "SVM and Neural Network based Diagnosis of Diabetic Retinopathy," International Journal of Computer Applications, Mar. 2012, 41(1):6-12.
'ico.org.uk' [online] "Anonymisation: managing data protection rise code of practice," Information Commissioner's Office (ICO), Nov. 2012 [retrieved on Jul. 20, 2018] Retrieved from Internet: URL<https://ico.org.uk/media/1061/anonymisation-code.pdf > 108 pages.
'www.cms.gov' [online] "Medicare provider utilization and payment data: physician and other supplier" Centers for Medicare & Medicaid Services, Last updated: May 23, 2018, [retrieved on Jul. 20, 2018] Retrieved from Internet: URL<https://www.cms.gov/Research-Statistics-Data-and-Systems/Statistics-Trends-and-reports/Medicare-provider-Charge-Data/Physician-and-Other-Supplier.html> 2 pages.
'www.publications.parliament.uk' [online] "Report on robotics and artificial intelligence," Science and Technology Committee (House of Commons) Oct. 2016 Report, [retrieved on Jul. 20, 2018] Retrieved from Internet: URL<https://www.publications.parliament.uk/pa/cm201617/cmselect/cmsctech/145/14502.htm> 1 page.
'www.rcr.ac.uk' [online] "Current and future workforce demand and supply," Royal College of Radiologists, 2015-2016 report [retrieved on Jul. 20, 2018] Retrieved from Internet: URL<https://www.rcr.ac.uk/sites/default/files/documents/hee_evidence_2015-16_clinical_radiology.pdf> 36 pages.
'www.rnib.org.uk' [online] "The State of the Nation Eye Health," Royal National Institute for the Blind (RNIB) 2016 Report, [retrieved on Jul. 20, 2018] Retrieved from Internet: URL<https://www.rnib.org.uk/knowledge-and-research-hub-research-reports/prevention-sight-loss/stateofthenation> 52 pages.
'data.oecd.org' [online] "Computed Tomography (CT) Exams (Indicators)," Available on Feb. 17, 2015 or before via the Wayback Internet Archive [retrieved on Jul. 20, 2018] Retrieved from Internet: URL<https://data.oecd.org/healthcare/computed-tomography-ct-exams.htm> 4 pages.
'data.oecd.org' [online] "Magnetic Resonance Imaging (MRI) exams (Indicators)," Available on or before Feb. 17, 2015 via the Wayback Internet Archive [retrieved on Jul. 20, 2018] Retrieved from Internet: URL< https://data.oecd.org/healthcare/magnetic-resonance-imaging-mri-exams.htm> 4 pages.
Abadi et al. "TensorFlow: Large-scale machine learning on heterogeneous distributed systems," arXiv 1603.04467v2, Mar. 16, 2016, 19 pages.
Apostolopoulos et al. "RetiNet: Automatic AMD identification in OCT volumetric data," arXiv 1610.03628, Oct. 12, 2016, 14 pages.
Arias et al. "Delay in treating age-related macular degeneration in Spain is associated with progressive vision loss," Eye, 23, Feb. 2009, 8 pages.
Bourne et al. "Magnitude, temporal trends and projections of the global prevalence of blindness and distance and near vision impairment: a systematic review and meta-analysis," Lancet Global Health 5(9), Sep. 2017, 10 pages.
Buchan et al. "How to defuse a demographic time bomb: the way forward?" Eye, 114, Jun. 2017, 8 pages.
Castelvecchi. "Can we open the black box of AI?," Nature News 538, Oct. 2016, 4 pages.
Chu et al. "Applying machine learning to automated segmentation of head and neck tumour volumes and organs at rise on radiotherapy planning CT and MRI scans," F1000 Research, Last updated Oct. 31, 2016, 8 pages.
Cicek et al. "3D U-Net: Learning dense volumetric segmentation from sparse annotation," arXiv 1606.06650, Jun. 21, 2016, 8 pages.
De Fauw et al. "Automated analysis of retinal imaging using machine learning techniques for computer vision," F1000Research. 5:1573, Jul. 2016, 8 pages.
Eltanboly et al. "A computer-aided diagnostic system for detecting diabetic retinopathy in optical coherence tomography images," Medical Physics, vol. 44, No. 3 Mar. 1, 2017, 10 pages.
Fang et al. "Automatic segmentation of nine retinal layer boundaries in OCT images of non-exudative AMD patient using deep learning and graph search," Biomedical Optics Express, Vo. 18 (5) May 1, 2017, 13 pages.
Farsiu et al. "Quantitative Classification of Eyes with and without Intermediate Age-related Macular Degeneration Using Optical Coherence Tomography," Ophthalmology, 121(1), Jan. 2014, 11 pages.

(56) References Cited

OTHER PUBLICATIONS

Folgar et al. "Comparison of optical coherence tomography assessments in the comparison of age-related macular degeneration treatments trials," Ophthalmology, 121, Oct. 2014, 15 pages.
Foot et al. "Surveillance of sight loss due to delay in ophthalmic treatment or review: frequency cause and outcome," Eye, 3 Eye 31, No. 5, May 2017, 5 pages.
Gulshan et al. "Development and validation of a deep learning algorithm for detection of diabetic retinopathy in retinal fundus photographs," JAMA, 316(22), Dec. 2016, 9 pages.
Huang et al. "Densely connected convolutional networks," arXiv1608.06993v5, Jan. 28, 2018, 9 pages.
Huang et al. "Optical coherence tomography," Science 254(5035) Nov. 1991, 12 pages.
Karri et al. "Transfer learning based classification of optical coherence tomography images with diabetic macular edema and dry age-related macular degeneration," Biomedical Optics Express 8(2) Feb. 2017, 14 pages.
Keane et al. "Evaluation of age-related macular degeneration with optical coherence tomography," Survey of Ophthalmology, 57, Sep. 2012, 26 pages.
Keane et al. "Predicting visual outcomes for macular disease using optical coherence tomography," Saudi J Ophthalmology 25(2), Apr. 2011, 14 pages.
Kingma et al. "Adam: A method for stochastic optimization," arXiv 1412.6980v9, Jan. 30, 2017, 15 pages.
Lakshminarayanan et al. "Simple and scalable predictive uncertainty estimation using deep ensembles," arXiv 1612.01474v3, Nov. 4, 2017, 15 pages.
Lee et al. "Deep Learning is effective for classifying normal versus age-related macular degeneration optical coherence tomography images," Ophthalmology Retina 4(1), Jul. 2017, 6 pages.
Owen et al. "The estimated prevalence and incidence of late stage age related macular degeneration in the UK," British Journal of Ophthalmology, 96(5), May 2012, 5 pages.
PCT International Preliminary Report on Patentability in International Appln. No. PCT/EP2018/067428, dated Jan. 9, 2020, 10 pages.
PCT International Search Report and Written Opinion issued in International Application No. PCT/EP2018/067428, dated Sep. 20, 2018, 16 pages.
Ronneberger et al. "U-Net:Convolutional networks for biomedical image segmentation," International Conference on Medical Image Computing and Computer-Assisted Intervention, Springer, Oct. 2015, arXiv1505.04597v1, 8 pages.
Roy et al. "ReLayNet: Retinal Layer and Fluid Segmentation of Macular Optical Coherence Tomography using Fully Convolutional Network," arXiv1704.02161v1, Apr. 7, 2017, 24 pages.
Rudnicka et al. "Incidence of Late-Stage Age-Related Macular Degeneration in American Whites: Systematic Review and Meta-analysis," American Journal of Ophthalmology, 160(1) Jul. 2015, 12 pages.
Schaal et al. "Anatomic clinical trial endpoints for nonexudative age-related macular degeneration," Ophthalmology, 123(5) May 2016, 20 pages.
Schindelin et al. "Fiji: an open-source platform for biological-image analysis," Nature Methods 9, Jul. 2012, 15 pages.
Schmidt-Erfurth et al. "A view of the current and future role of optical coherence tomography in the management of age-related macular degeneration," Eye 31, Jan. 2017, 19 pages.
Schmidt-Erfurth et al. "Machine Learning to Analyze the Prognostic Value of Current Imaging Biomarkers in Neovascular Age-Related Macular Degeneration," Ophthalmology Retina, 2(1) Jan. 1, 2018, 7 pages.
Seebock et al. "Identifying and Categorizing Anomalies in Retinal Imaging Date," arXiv 1612.00686, Dec. 2, 2016, 5 pages.
Silver et al. "Mastering the game of Go with deep neura networks and tree search," Nature 529, Jan. 2016, 20 pages.
Srinivasan et al. "Fully automated detection of diabetic macular edema and dry age-related macular degeneration from optical coherence tomography images," Biomedical Optics Express 5(10) Oct. 2014, 10 pages.
Szegedy et al. "Rethinking the inception architecture for computer vision," Proceedings of the IEEE Conference on Computer Vision and Pattern Recognition, 2016, 9 pages.
Villani et al. "Decade-Long Profile of Imaging Biomarker Use in Ophthalmic Clinical Trials," Invest Ophthalmol Vis. Sci. 58(6), May 2017, 6 pages.
Office Action in Chinese Appln. No. 201880025979.4, dated Apr. 23, 2023, 15 pages (with English Translation).
Office Action in Chinese Appln. No. 201880025979.4, dated Nov. 29, 2023, 17 pages (with English translation).

\* cited by examiner

GENERALIZABLE MEDICAL IMAGE ANALYSIS USING SEGMENTATION AND CLASSIFICATION NEURAL NETWORKS

CROSS-REFERENCE TO RELATED APPLICATIONS

This application is a continuation application of, and claims priority to, U.S. patent application Ser. No. 16/236,045, titled "GENERALIZABLE MEDICAL IMAGE ANALYSIS USING SEGMENTATION AND CLASSIFICATION NEURAL NETWORKS," filed on Dec. 28, 2018, which is a continuation application of, and claims priority to, U.S. patent application Ser. No. 16/022,170, titled "GENERALIZABLE MEDICAL IMAGE ANALYSIS USING SEGMENTATION AND CLASSIFICATION NEURAL NETWORKS," filed on Jun. 28, 2018, which application claims the benefit under 35 U.S.C. § 119(e) of U.S. Patent Application No. 62/586,822," filed Nov. 15, 2017 and U.S. Patent Application No. 62/526,293 filed Jun. 28, 2017. The disclosure of each of the foregoing applications are incorporated herein by reference in their entirety for all purposes.

BACKGROUND

This specification relates to analyzing medical images using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that processes medical images using neural networks.

According to a first aspect there is provided a system comprising one or more computers and one or more storage devices storing instructions that when executed by the one or more computers cause the one or more computers to implement a first set of one or more segmentation neural networks. Each segmentation neural network in the first set may be configured to: receive an input image of eye tissue captured using a first imaging modality, and process the input image to generate a segmentation map that segments the eye tissue in the input image into a plurality of tissue types. The instructions may also cause the one or more computers to implement a set of one or more classification neural networks, wherein each classification neural network is configured to: receive a classification input derived from a segmentation map of eye tissue, and process the classification input to generate a classification output that characterizes the eye tissue. The instructions may also cause the one or more computers to implement a subsystem configured to: receive a first image of eye tissue captured using the first imaging modality; provide the first image as input to each of the segmentation neural networks in the first set to obtain one or more segmentation maps of the eye tissue in the first image; generate, from each of the segmentation maps, a respective classification input; and provide, for each of the segmentation maps, the classification input for the segmentation map as input to each of the classification neural networks to obtain, for each segmentation map, a respective classification output from each classification neural network; and generate, from the respective classification outputs for each of the segmentation maps, a final classification output for the first image.

Some advantages which may be provided by a system of this type are described later.

The imaging modality may be defined by a type of imaging system used to capture the input image; for example it may be a medical scanning device. The classification input may comprise input data for classification by one of the classification neural networks. The classification input may comprise a segmentation map or may be derived from a segmentation map, for example by processing a segmentation map to down-sample the segmentation map. Thus generating a classification input from a segmentation map may comprise making the segmentation map accessible to one of the classification neural networks or it involve processing the segmentation map. The classification output may comprise data identifying one of a set of classes characterizing the eye tissue and/or a set of scores for such a set of classes. Generating the final classification output may comprise making such a classification output available or it may comprise further processing the classification outputs from the one or more classification neural networks. For example the classification outputs may be combined according to a defined compromise between sensitivity of the system to making a final classification and a false alarm rate for the final classification, for example by rescaling classification probabilities from an ensemble of the classification neural networks.

The input image of the eye tissue may be a three-dimensional image comprising a plurality of voxels, and the segmentation map may then assign a respective tissue type, for example from a predetermined set of tissue types, to each of the voxels, for example by providing data identifying each voxel as belong to a tissue type.

The subsystem is further configured to provide a representation, for example a visualization, of at least one of the segmentation maps for presentation on a user device. Such an intermediate data output can provide an explanation of the final classification. Thus in implementations the system is not intended to provide a diagnosis but rather a tool which can be used by a human, for example to draw attention to potential features of interest for expert consideration. For example one such representation of the segmentation map may include, for each of the plurality of tissue types, a two-dimensional thickness map overlaid on a projection of the captured image from the medical scanner, or a processed version thereof. The projection may be a representation in 2D of a 3D, volumetric captured image. The representation may comprise a 3D visualization of this information. Additionally or alternatively the thickness maps for different tissue types may be displayed side by side. Still further additionally or alternatively the representation of the segmentation map may include a three-dimensional representation of the tissue that differentiates between tissue of different types as identified in a segmentation map. In some implementations multiple segmentation neural networks are employed to generate multiple segmentation maps, and system is configured to allow a user to cycle through the segmentation hypotheses, that is the segmentation maps represented, optionally together the final classification output and/or an associated probability or other score. This can help to give the user an intuitive insight into segmentation confidence in different tissue regions, particularly in difficult or ambiguous cases. For example a clinician might understand that if a particular image structure is interpreted as X then the probability for a particular classification is Y. Some example classifications are described later.

In some implementations the instructions further cause the one or more computers to implement a second set of one or more segmentation neural networks, each configured to receive an input image of eye tissue captured using a second, different imaging modality. This may be used to generate one or more further segmentation maps, which may then be processed by one or more of the classification neural networks. Optionally classifications of segmentation maps from the two image modalities may be combined to generate the final classification output.

In another aspect there is provided a system comprising one or more computers and one or more storage devices storing instructions that when executed by the one or more computers cause the one or more computers to implement a first set of one or more segmentation neural networks. Each segmentation neural network in the first set may be configured to receive an input image of eye tissue captured using a first imaging modality, and to process the input image to generate a segmentation map that segments the eye tissue in the input image into a plurality of tissue types. The instructions may also cause the one or more computers to implement a subsystem to receive a first image of eye tissue captured using the first imaging modality and provide the first image as input to each of the segmentation neural networks in the first set to obtain one or more segmentation maps of the eye tissue in the first image. Other features of such a system may be as previously described.

There is also described a medical image classification neural network system. The system comprises an image data input to receive image data representing one or more medical images of a region of a human or animal body, at least one first, image segmentation neural network, and at least one second, classification neural network. The image segmentation neural network is coupled to the image data input to segment the image data for the region into a plurality of different tissue types. This may provide tissue segmentation map data in which pixel or voxel elements are annotated as belonging to one of said plurality of different tissue types, for example using one-hot encoding. The classification neural network may receive the tissue segmentation map data, classify the region into one or more of a plurality of discrete classifications, and output corresponding classification data. The classifications may correspond to pathologies and/or clinical referral decisions. Thus the classification neural network(s) may classify an image onto each of two (or more) groups of classifications.

Such systems may provide automated classification of medical images as accurately or more accurately than some medical experts. The system can thus provide a tool which allows a clinician to make more informed diagnoses. Particularly advantageously, some examples of the system comprise an intermediate data output which provides a representation of the tissue segmentation map data for viewing or other interrogation by the clinician. This is useful because it enables a clinician to review the "evidence" on which the classification output by the system is based. This in turn facilitates a clinician in being able to place reliance on an image classification produced by the system.

The system may have a plurality of different first, image segmentation neural networks, each coupled to the image data input, and each providing different said tissue segmentation map data to one or more of the second, classification neural networks. The at least one second, classification neural network may provide a set of said discrete classifications, one for each image segmentation neural network. Thus the system may include a set of different, more particularly differently trained, image segmentation neural networks to allow the system to produce a corresponding set of classifications. The different image segmentation neural networks will typically produce broadly similar tissue segmentation maps differing in details of the mapping, particularly with "difficult" or ambiguous images. This allows the system to produce a set of different classifications, each corresponding to a slightly different hypothesis regarding the underlying tissue map.

The intermediate data output may be configured to provide a representation of each different tissue segmentation map data for viewing. This enables the clinician to visualize and/or investigate the effects of these different hypotheses on the classification, and to apply their own clinical judgement to the result, particularly if a user can cycle through the different tissue segmentation hypotheses and classifications. Thus the system may include a user interface to enable a user to selectively display each representation of each different tissue segmentation map in conjunction with a representation of the classification for the selected tissue segmentation map, such that the user is enabled to cycle through different tissue segmentation hypotheses and concurrently to determine the classification for each tissue segmentation hypothesis.

The system may also include a set of different, for example differently trained, classification neural networks. The outputs of these neural networks may be combined to increase the accuracy of the classification. For example each second, classification neural network may be coupled to the or each image segmentation neural network to provide a set of discrete classifications, one for each classification neural network. The classification data output may be derived from this set of discrete classifications.

The system may also include a reweighting subsystem to receive a set of discrete classifications and reweight a probability of a classification defined by the set in accordance with a rescaling factor, to adjust a balance between sensitivity and specificity of the classifications. The reweighting subsystem may be implemented by a reweighting network, which may be an output stage of the system; it may operate to reduce or minimize a penalty cost for misclassification of an image, for example as defined by a misclassification cost matrix.

The system may also include a tissue measuring module coupled to the at least one first, image segmentation neural network to determine an area or volume of one or more of the plurality of different tissue types in the imaged region.

The image segmentation neural network may comprise a convolutional neural network and may have a U-net architecture, as described later. The image data processed by the system may be 2D or 3D image data generated by any medical imaging technique. The image segmentation neural network(s) and classification neural network(s) may be trained by separate, supervised learning procedures, for example using manually labelled training images.

Example implementations are described with reference to segmentation and classification of eye tissue but the techniques may also be applied to the segmentation and classification of other tissue types. More specifically, the approach of visualizing the effects of multiple different tissue segmentations as an aid for the user to understand their effects, and hence to gain insight into the underlying explanation for the output classification, is generally applicable to many different tissue regions and types. For example X-ray, ultrasound or MRI images all produce images of 3D volumes of regions of the body, and it will be apparent that the image segmentation neural network described may be used to segment different tissue types from such images (or from similar 2D images). The segmented region may then be analyzed by the classification neural network to classify the image data, for example identify one or more pathologies and/or determine one or more clinical referral decisions.

An example application to screening for eye disease is described later. However other implementations of the system may be used for screening for other pathologies in other body regions. For example the system may be trained on segmented and classified images of breast or prostate images to assist in cancer screening. As previously mentioned, one advantage of implementations of the system is not the absolute effectiveness of the classification, which may nonetheless be high, so much as the ability of the system to provide an intermediate, clinically interpretable, representation of the segmented tissue map or maps used as basis for the classification, which enables a user to recognize the clinical basis for a classification.

Particular embodiments of the subject matter described in this specification can be implemented so as to realize one or more of the following further advantages.

The system described in this specification may reduce the use of computational resources (e.g., memory and computing power) relative to some conventional systems. For example, the system described in this specification can process a medical image using one or more segmentation neural networks to generate segmentation maps of the medical image, and can thereafter process classification inputs generated from the segmentation maps (e.g., by downscaling the segmentation maps) using one or more classification neural networks to generate classification outputs characterizing the medical image. Since the classification neural networks may be trained by a separate supervised learning procedure than the segmentation neural networks, the classification neural networks can process classification inputs generated from segmentation maps to determine classification outputs independently of how the segmentation maps are generated. Therefore, the system can use modified segmentation neural networks (e.g., which are trained on additional training data), or can add additional segmentation neural networks (e.g., which are configured to process additional medical images of different modalities), without retraining the classification neural networks. In contrast, in some conventional systems, modifying the input to the system (e.g., by processing additional images of different modalities) requires retraining the entire conventional system. Therefore, the system described in this specification may reduce use of computational resources (e.g., memory and computing power) relative to some conventional systems by obviating the need to retrain the classification neural networks when, for example, the segmentation neural networks are modified or additional segmentation neural networks are added to the system.

As another example, the system described in this specification may require less training data (i.e., fewer training examples) to achieve an acceptable level of performance than some conventional systems. By decoupling the training of the segmentation neural networks and the classification neural networks, the system can train each of these neural networks to perform an "easier" task (i.e., just segmentation, or just classification, rather than both together), thereby requiring less training data. In contrast, some conventional systems are trained end-to-end (i.e., to generate classification outputs directly from medical images), and thereby require substantially more training data. By requiring less training data the system described in this specification can reduce the use of computational resources (e.g., memory and computing power).

The system described in this specification can be efficiently adapted to process additional medical images, for example, generated by medical imaging scanners of different modalities. In particular, while additional segmentation neural networks may need to be trained to process the additional medical images, the classification neural networks do not need to be retrained to accommodate the additional segmentation maps generated from the additional medical images. In contrast, in some conventional systems that are trained end-to-end, processing additional medical images requires training the entire system. Therefore, the system described in this specification may require fewer computational resources (e.g., memory and computing power) to be adapted to process additional medical images than some conventional systems.

The system described in this specification can determine segmentation map representations based on the segmentation maps. The segmentation map representations may be clinically interpretable representations of the segmentation maps which can enable a user of the system (e.g., a clinician) to recognize a clinical basis for the final classification output generated by the system for the input medical image. For example, a user of the system can review the "evidence" on which the final classification output is based (i.e., the segmentation maps) to determine a reliability of the final classification output generated by the system. In contrast, some conventional systems operate as "black boxes" which do not reveal any insight into how classification outputs are determined. Therefore, the reliability of the classification outputs generated by such conventional systems may be difficult to assess.

The system described in this specification can, in some cases, generate final classification outputs which are more accurate than some medical experts. For example, the system can determine a more appropriate referral for a patient (e.g., indicating an urgency with which the patient should receive medical treatment) than some medical experts. Moreover, the system described in this specification can generate segmentation map representations which can be presented to a clinician (e.g., a physician) on a display (e.g., a computer display). These segmentation map representations can be reviewed by the clinician to determine the reliability of the final classification output (as described earlier), and may reveal additional insights which the clinician can use in providing medical care. Therefore, the system can be integrated into clinical (e.g., hospital) environments to enhance the quality and efficiency of medical care.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
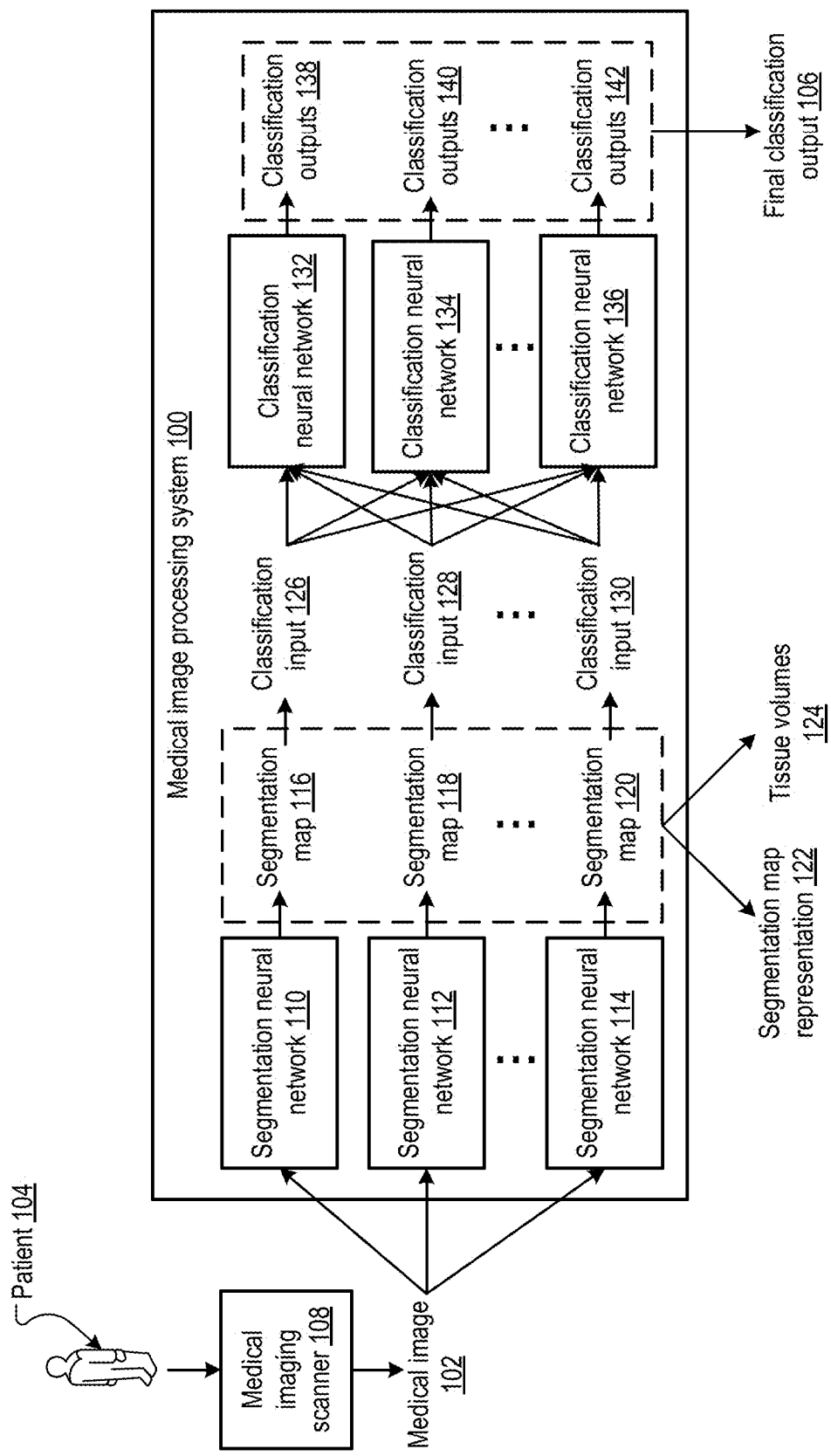
FIG. 1A is a block diagram of an example medical image processing system.

FIG. 1A shows an example medical image processing system 100. The medical image processing system 100 is an example of a system implemented as computer programs on one or more computers in one or more locations in which the systems, components, and techniques described below are implemented.

The medical image processing system 100 is configured to process a medical image 102 depicting a region of the body of a patient 104 to generate a final classification output 106 which characterizes the medical image 102. For example, as will be described in more detail later, the final classification output 106 may include a respective referral score for each of multiple possible clinical referral decisions for the patient 104.

The patient 104 may be a human or an animal. The region of the body of the patient 104 depicted by the medical image 102 may be, for example, the tissue of an eye, a breast, a prostate, a brain, or the whole body. The medical image 102 may be a two-dimensional (2D) image (e.g., represented as a 2D array of pixels), a three dimensional (3D) image (e.g., represented as a 3D array of voxels), or a higher dimensional image. The medical image 102 can be acquired by a medical imaging scanner 108 of any modality, for example, an optical coherence tomography (OCT) scanner, a magnetic resonance imaging (MRI) scanner, an X-ray scanner, a computed tomography (CT) scanner, an ultrasound (US) scanner, or a photographic scanner. In a particular example, the medical image 102 may be a 3D OCT image (i.e., acquired by an OCT scanner) of one of the patient's eyes, where the intensity of each voxel indicates the reflection and absorption of light waves at a corresponding location in the eye tissue of the patient 104. For convenience, the medical image 102 is described herein as a 3D image represented as a 3D array of voxels.

The system 100 provides the medical image 102 as an input to each of one or more segmentation neural networks (e.g., the segmentation neural networks 110, 112, 114). Each segmentation neural network is configured to receive an input including the medical image 102 and to process the input in accordance with current values of segmentation neural network parameters to generate a segmentation map (e.g., the segmentation maps 116, 118, and 120). Each segmentation map characterizes a plausible segmentation of the medical image 102 into multiple different tissue types from a predetermined set of tissue types and other components. For example, if the medical image 102 is an OCT image of one of the patient's eyes, the predetermined set of tissue types may include: vitreous and subhyaloid space (i.e., the area above the internal limiting membrane not covered by other segmentation classes), posterior hyaloid (i.e., the hyper-reflective membrane visible above the retina in cases of posterior vitreous detachment), epiretinal membrane (i.e., the hyper-reflective band seen on the inner surface of the retina), neurosensory retina (i.e., all layers and contents of the retina excepting certain pathological features), intraretinal fluid (i.e., areas of round or oval hyporeflectivity located within the neurosensory retina), subretinal fluid (i.e., hyporeflective areas in the subretinal space), subretinal hyperreflective material (i.e., areas of hyperreflectivity between the retinal and retinal pigment epithelium (RPE)), RPE (i.e., hyperreflective band underlying the neurosensory retina), drusenoid pigment epithelium detachment (i.e., PED—elevation of the RPE and without the presence of fibrovascular material), serous PED (i.e., dome-shaped elevation of the RPE relative to Bruch's membrane), fibrovascular PED (i.e., irregular elevations of the RPE relative to Bruch's membrane containing fibrovascular tissue), choroid and outer layers (i.e., area below the RPE not covered by other tissue classes), mirror artefact (i.e., artefact caused by patient anatomy out of the OCT frame being reflected back onto the OCT), clipping artefact (i.e., padding voxels introduced at the edges of the OCT slice during image processing), and blink artefact (i.e., absent information due to patient blink), amongst others. The tissue types may be represented by respective codes of a set of codes. A tissue type may be an unidentifiable tissue type.

The description herein refers to the system 100 generating the segmentation maps using one or more segmentation neural networks. In general, the system 100 can generate the segmentation maps by any appropriate method and is not restricted to using one or more segmentation neural networks. For example, the system 100 can include a segmentation subsystem that is configured to process the medical image xxx to generate the segmentation maps. The segmentation module can generate the segmentation maps in any appropriate manner, for example, using random forests, support vector machines, linear regression engines, or a combination thereof.

In some implementations, each segmentation map assigns a respective tissue type from the predetermined set of tissue types to each voxel of the medical image 102. For example, the tissue type assigned to a voxel may be represented as a one-hot vector. In some other implementations, each segmentation map assigns a respective probability for each tissue type from the predetermined set of tissue types to each voxel of the medical image 102. For example, the respective probabilities of the tissue types assigned to a voxel may be represented as a vector of respective probability values. Alternatively, the system 100 can produce a number of plausible segmentation maps (with according probabilities) that represent the full distribution of plausible segmentations. The system 100 may store one or more of the generated segmentation maps in a data store (e.g., a logical data storage area or a physical data storage device). A user of the system 100 (e.g., a clinician) may subsequently retrieve the segmentation maps from the data store for use in informing clinical decisions regarding the patient 104. In some cases, the system 100 may directly present one or more of the generated segmentation maps on a display device (e.g., a computer screen) visible to a user of the system 100 (e.g., a clinician).

Each segmentation neural network may have a different neural network architecture (e.g., number and configuration of layers) or different values of segmentation neural network parameters. For example, each of the segmentation neural networks may have the same neural network architecture but different values of segmentation neural network parameters due to each of the segmentation neural networks having been trained with differently initialized parameter values, on different training images, or both. For example, the segmentation neural networks may have been trained with differently initialized parameter values if the parameter values of each segmentation neural network were stochastically initialized by sampling from probability distributions. An example process for training a segmentation neural network is described with reference to FIG. 3.

The segmentation neural networks may be implemented to include convolutional neural network layers, fully-connected neural network layers, batch-normalization layers, multiplicative layers, squeeze-and-excitation layers, or as any other neural network layers in any appropriate configuration. For example, the segmentation neural networks may be implemented by an architecture derived from the U-Net neural network architecture, described with reference to: O. Ronneberger et al., "U-Net: Convolutional Networks for Biomedical Image Segmentation", arXiv:1505.04597. In a particular example, the segmentation neural networks may be implemented as convolutional neural networks including a downwards, analysis path and an upwards, synthesis path, where each path includes multiple neural network layers. The analysis path may include multiple down-sampling, for example convolutional, layers and the synthesis path may include multiple up-sampling, for example up-convolutional layers. In addition to convolutional layers, up and/or down sampling may be partially or wholly implemented by interpolation. The segmentation neural networks may include shortcut skip or residual connections between layers of equal resolution in the analysis and synthesis paths. In some implementations at least one of a set of one or more layers between the analysis and synthesis paths includes a fully-connected set of layers.

Each of the segmentation maps of the medical image 102 represents a different hypothesis for the segmentation of the medical image 102 into different tissue types. More specifically, the different segmentation neural networks will typically produce broadly similar segmentation maps of the medical image 102, with the different segmentation maps differing in details of the segmentation, particularly when the medical image 102 is "difficult" or ambiguous.

As will be described further with reference to FIG. 2, the system 100 may determine a segmentation map representation 122 based on at least one of the segmentation maps. The system 100 may determine the segmentation map representation 122 to be a clinically interpretable representation of the segmentation maps which can enable a user of the system 100 (e.g., a clinician) to recognize a clinical basis for the final classification output 106 for the medical image 102. The system 100 may generate multiple segmentation map representations 122 which convey to a user of the system 100 how the different segmentation maps differ in the details of the segmentation. Moreover, the system 100 may determine predicted tissue volumes 124 for each tissue from the predetermined set of tissues based on at least one of the segmentation maps. For example, the system 100 may determine a predicted tissue volume 124 for a particular tissue based on a particular segmentation map by determining a product of: (i) the voxel volume, and (ii) the number of voxels assigned to the particular tissue by the particular segmentation map. A user of the system 100 may use the rich qualitative and quantitative information provided by the segmentation map representation 122 and predicted tissue volumes 124 in, for example, determining a referral for the patient 104.

To generate the final classification output 106, the system 100 determines a respective classification input (e.g., the classification inputs 126, 128, and 130) from each of the segmentation maps. For example, the system 100 may determine a classification input from a segmentation map by determining the classification input to be a down-sampled version of the segmentation map. Down-sampling a segmentation map refers to determining a lower resolution, for example a lower spatial resolution, more compact representation of the segmentation map (e.g., by retaining only a representative subset of the data in the segmentation map). As another example, the system 100 may determine a classification input from a segmentation map by sampling a respective tissue type for each voxel of the medical image 102 in accordance with a probability distribution over the tissue types for the voxel defined by the segmentation map. In this example, the classification input may include data defining the sampled tissue type for each voxel of the medical image 102. As another example, the system 100 may determine a classification input from a segmentation map by selecting a respective tissue type for each voxel of the medical image 102 as a tissue type with a highest probability according to a probability distribution over the tissue types for the voxel defined by the segmentation map. In this example, the classification input may include data defining the selected tissue type for each voxel of the medical image 102.

The system 100 provides the classification input for each segmentation map as an input to each of one or more classification neural networks (e.g., the classification neural networks 132, 134, and 136). Each classification neural network is configured to receive an input including a classification input and, optionally, data defining characteristics of the patient 104 (e.g., age, sex, visual acuity, or a clinical vignette). Each classification neural network is configured to process the input in accordance with current values of classification neural network parameters to generate a classification output (e.g., the classification outputs 138, 140, and 142) characterizing the medical image 102. The system 100 generates a respective classification output for each classification input using each classification neural network. That is, if the number of segmentation maps is S and the number of classification neural networks is C, then the system 100 generates S×C different classification outputs. In some implementations, each classification neural network is configured to jointly process multiple different segmentation maps.

In some implementations, the classification output generated using a classification neural network by processing a classification input determined from a segmentation map includes a respective referral score for each of multiple possible clinical referral decisions. Each referral score may represent a predicted likelihood that the corresponding referral decision is the most appropriate referral decision for the patient 104, conditioned on the segmentation map of the medical image 102 of the patient 104. A clinical referral decision may reflect an urgency with which the patient 104 should receive further medical attention (e.g., by a specialist physician). Examples of clinical referral decisions include: observation only, routine, semi-urgent, and urgent.

In some implementations, the classification output generated using a classification neural network by processing a classification input determined from a segmentation map includes a respective condition score for each of multiple medical conditions. Each condition score may represent a predicted likelihood that the patient 104 has the medical condition, conditioned on the segmentation map of the medical image 102 of the patient. For example, if the medical image is an OCT image of the patient's eye, then the medical conditions may include: normal condition, macular retinal edema (MRO), choroidal neovascularization (CNV), and geographic atrophy, amongst others.

In some implementations, the classification output generated using a classification neural network by processing a classification input determined from a segmentation map includes a respective progression score for each of multiple condition states. Each progression score may represent a predicted likelihood that a state of a corresponding medical condition will progress to the condition state at a particular future time, conditioned on the segmentation map of the medical image 102 of the patient 104. For example, the condition states include: a stable state, a slow progression state, or a rapid progression state.

In some implementations, the classification output generated using a classification neural network by processing a classification input determined from a segmentation map includes a respective treatment score for each of multiple medical treatments. Each treatment score may represent a predicted likelihood that the medical treatment is the best medical treatment for the patient 104, conditioned on the segmentation map of the medical image 102 of the patient 104, more particularly the treatment that is relatively the best amongst a set of treatments. For example, the medical treatments may include: no treatment, surgery, or the administration of various different drugs.

In some implementations, the classification output generated using a classification neural network by processing a classification input determined from a segmentation map includes multiple different types of scores (e.g., the previously described scores). For example, the classification output may include both referral scores and condition scores.

Each classification neural network may have a different neural network architecture (e.g., number and configuration of layers) or different values of classification neural network parameters. For example, each of the classification neural networks may have the same neural network architecture but different values of classification neural network parameters due to each of the classification neural networks having been trained with differently initialized parameter values, on differently permuted training classification inputs, or both. For example, the classification neural networks may have been trained with differently initialized parameter values if the parameter values of each classification neural network were stochastically initialized by sampling from probability distributions. An example process for training a classification neural network is described with reference to FIG. 4.

The description herein refers to the system 100 generating the classification outputs using one or more classification neural networks. In general, the system 100 can generate the classification outputs by any appropriate method and is not restricted to using one or more classification neural networks. For example, the system 100 can include a classification subsystem that is configured to process the classification inputs to generate the classification outputs. The classification subsystem can generate the classification outputs in any appropriate manner, for example, using random forests, support vector machines, linear regression engines, or a combination thereof.

Each of the classification outputs generated by the system 100 for the medical image 102 represents a different hypothesis characterizing the medical image 102. More specifically, the different classification neural networks apply different sets of criteria (defined by the respective current parameter values of the classification neural networks) to classification inputs characterizing each of the segmentation maps to generate different hypotheses characterizing the medical image 102. This enables a user of the system 100 (e.g., a clinician) to visualize and investigate the effects of different segmentation maps and different criteria for analyzing them on the classification outputs. The user of the system 100 can then apply their own clinical judgement to the result. For example, the user of the system 100 can review the "evidence" on which the final classification output 106 is based (i.e., the segmentation maps) to determine a reliability of the final classification output 106 generated by the system 100.

The classification neural networks may be implemented to include convolutional neural network layers, fully-connected neural network layers, or any other neural network layers in any appropriate configuration. For example, the classification neural networks may be implemented as convolutional neural networks with one or more 3D densely connected convolutional blocks. A 3D densely connected convolutional block refers to a sequence of multiple 3D convolutional neural network layers (i.e., convolutional layers with 3D filters), where each convolutional layer receives an input which includes the output of each previous convolutional layer in the block.

After generating the respective classification outputs for each of the segmentation maps, the system 100 can combine the classification outputs to generate a final classification output 106. For example, the system 100 may determine the final classification output 106 as an average of the classification outputs for each of the segmentation maps. In some cases, the system 100 can generate a final classification output 106 which is more accurate than some medical experts. Therefore, a user of the system 100 (e.g., a clinician) may use the final classification output 106, for example, in determining an appropriate referral for the patient 104.

Generally, the classification neural networks may be trained by a separate supervised learning procedure than the segmentation neural networks (e.g., as will be described further with reference to FIG. 3 and FIG. 4). Therefore, the classification neural networks can process classification inputs generated from segmentation maps to determine classification outputs independently of how the segmentation maps are generated. For example, the classification neural networks can process classification inputs generated from segmentation maps of a medical image acquired by a different medical imaging scanner than the medical imaging scanner 108. For example, the different medical imaging scanner may be a medical imaging scanner of a different modality, a medical imaging scanner built by a different manufacturer, or a medical imaging scanner with components of a different age than the medical imaging scanner 108.

To process the different medical image (as described earlier), the system 100 can generate different segmentation maps from the different medical image of the patient 104. For example, the system 100 can process the different medical image by segmentation neural networks which are trained to process the different medical images to generate different segmentation maps characterizing the different medical image. The system 100 can determine a classification input from each different segmentation map, and provide the classification inputs for processing by the classification neural networks to generate different classification outputs. The system 100 can use the different classification outputs in determining the final classification output 106. In this manner, the system 100 can determine the final classification output 106 from different medical images (e.g., of different modalities) without retraining the classification neural networks.

Figure 1B:
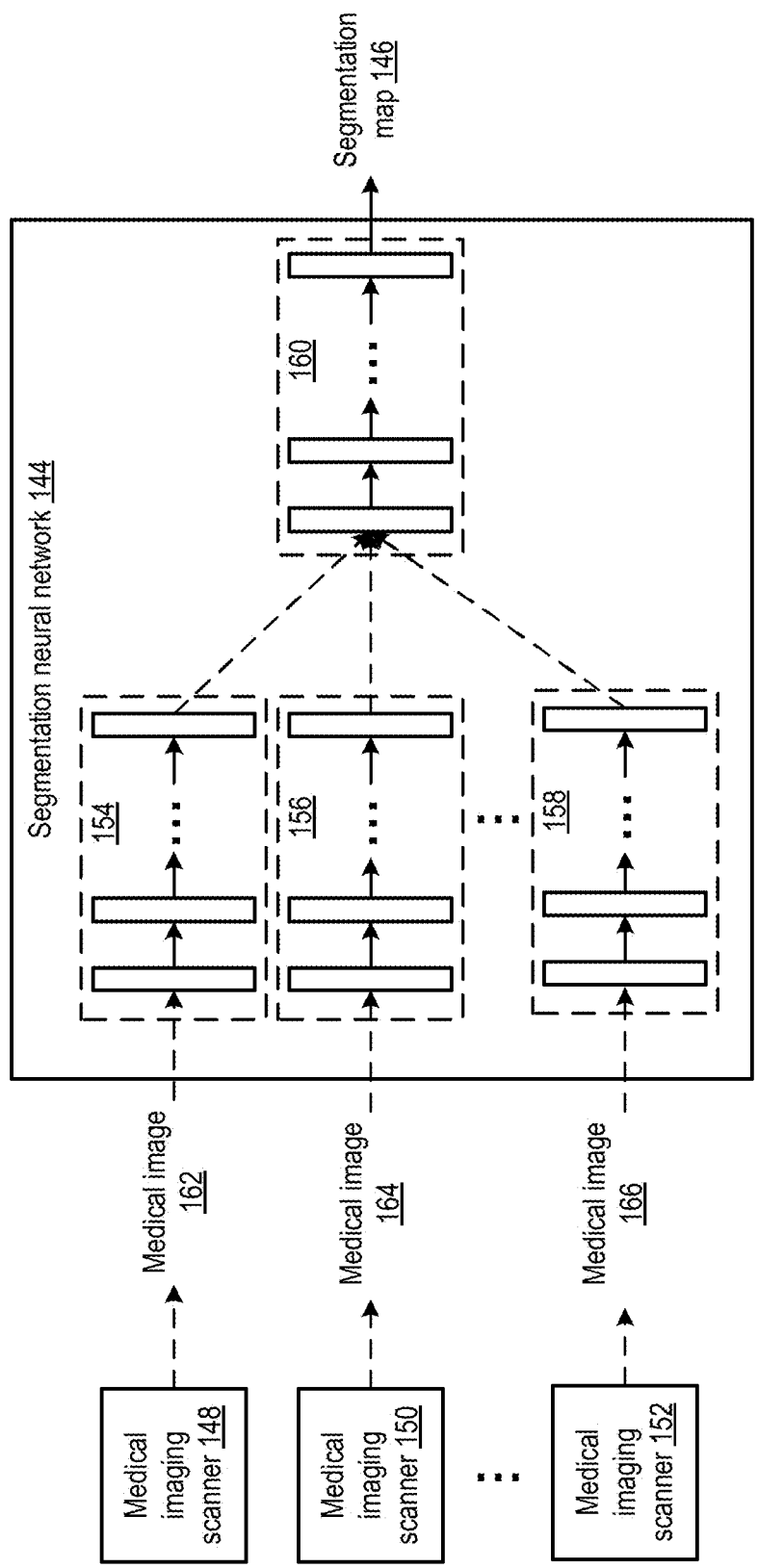
FIG. 1B is a block diagram of an example segmentation neural network.

FIG. 1B is a block diagram of an example segmentation neural network 144 (e.g., the segmentation neural network 110, 112, or 114 of FIG. 1A). As described previously, the segmentation neural network 144 is configured to receive an input including a medical image (e.g., the medical image 162, 164, or 166) and to process the input in accordance with current values of segmentation neural network parameters to generate a segmentation map 146. Generally, the medical image may be acquired by any of multiple different medical imaging scanners (e.g., the medical imaging scanners 148, 150, and 152). The different medical imaging scanners may be different scanners of a same modality (e.g., made by different manufacturers) or of different modalities (e.g., one may be an OCT scanner, while another may be an MRI scanner). Generally, the characteristics of the medical image (e.g., the voxel intensities, the image resolution, the noise distribution, and the like) vary depending on which scanner acquired the medical image.

The segmentation neural network 144 includes multiple scanner adaptation branches (e.g., the scanner adaptation branches 154, 156, and 158), each of which corresponds to a different medical imaging scanner. Each scanner adaptation branch includes one or more neural network layers, and different scanner adaptation branches generally have different parameter values. Each scanner adaption branch is configured to receive an input including a medical image acquired by the corresponding medical imaging scanner, to process the input in accordance with current values of the neural network layers of the scanner adaptation branch, and to generate a scanner adaptation branch output.

To process an input medical image, the segmentation neural network 144 first selects a scanner adaptation branch for the medical image. For example, the segmentation neural network 144 may select the scanner adaptation branch by determining that a particular medical image scanner acquired the medical image (e.g., by accessing meta-data stored in a header file of the medical image), and selecting the scanner adaptation branch corresponding to the particular medical image scanner. In a particular example, the segmentation neural network 144 may select scanner adaptation branch 154 for medical image 162 acquired by medical image scanner 148, scanner adaptation branch 156 for medical image 164 acquired by medical image scanner 150, and scanner adaptation branch 158 for medical image 166 acquired by medical image scanner 152.

After selecting a scanner adaptation branch for the medical image, the segmentation neural network 144 processes the medical image using the selected scanner adaptation branch to generate a scanner adaptation branch output. The segmentation neural network 144 provides the scanner adaptation branch output to a common representation block 160, which is configured to process the scanner adaptation branch output in accordance with current values of the neural network layers of the common representation block 160 to generate the segmentation map 146. By using multiple different scanner adaptation branches, the segmentation neural network 144 can learn to compensate for the differences between medical imaging scanners.

Figure 1C:
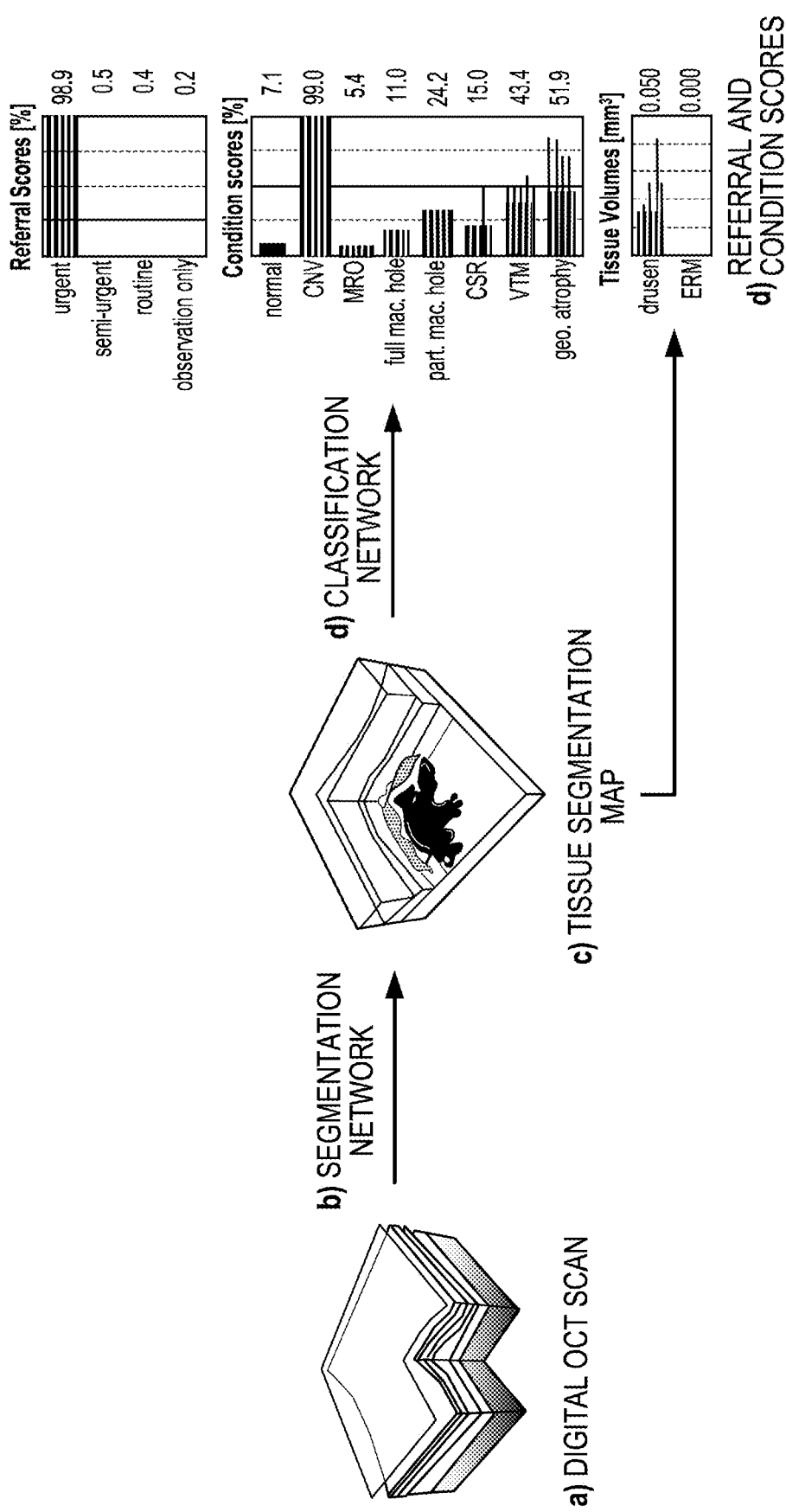
FIG. 1C is an example data flow for determining referral scores and condition scores from an optical coherence tomography image.

FIG. 1C is an example data flow for determining referral scores and condition scores from an optical coherence tomography image (OCT) image. The OCT image (e.g., of an eye) is processed by one or more segmentation neural networks to generate one or more tissue segmentation maps. Respective classification inputs generated from each of the tissue segmentation maps are processed by one or more classification neural networks to generate classification outputs including respective referral scores for each of multiple possible clinical referral decisions and respective condition scores for each of multiple possible medical conditions. Moreover, the volumes of different tissues are determined from the tissue segmentation maps.

As previously described a classification output, in particular the final classification output, may comprise a set of scores or pseudo-probabilities, q, one for each class. These may be further processed to adjust a balance between accuracy (that is "sensitivity" or whether or not a classification is correct) and the consequences of an incorrect decision (that is false alarm rate=1−specificity). For example for two classes a rescaling factor a may be applied to provide a re-weighted probability $$p = \frac{aq}{(aq + (1-a)(1-q))}.$$

The scaling factor a may be chosen such that a 50% pseudo-probability achieves a maximal (sensitivity+specificity)/2. Where there are more than two classes, for example four classes, a misclassification penalty matrix may be used to optimize a scaling factor for each class. This matrix may have rows corresponding to each actual class (for example urgent, semi-urgent, routine, observation for referrals) and columns corresponding to each predicted class; it may be normalized. Entries in the matrix may correspond to penalties; thus diagonal values may have entries of zero and, for example, a misclassification or an urgent referral as merely for observation may be given a high penalty. The scaling factors for each class may be learned by training to reduce an overall cost defined by the penalty matrix, for example applying a softmax layer to the pseudo-probabilities and using a weighted cross-entropy loss.

Figure 2:
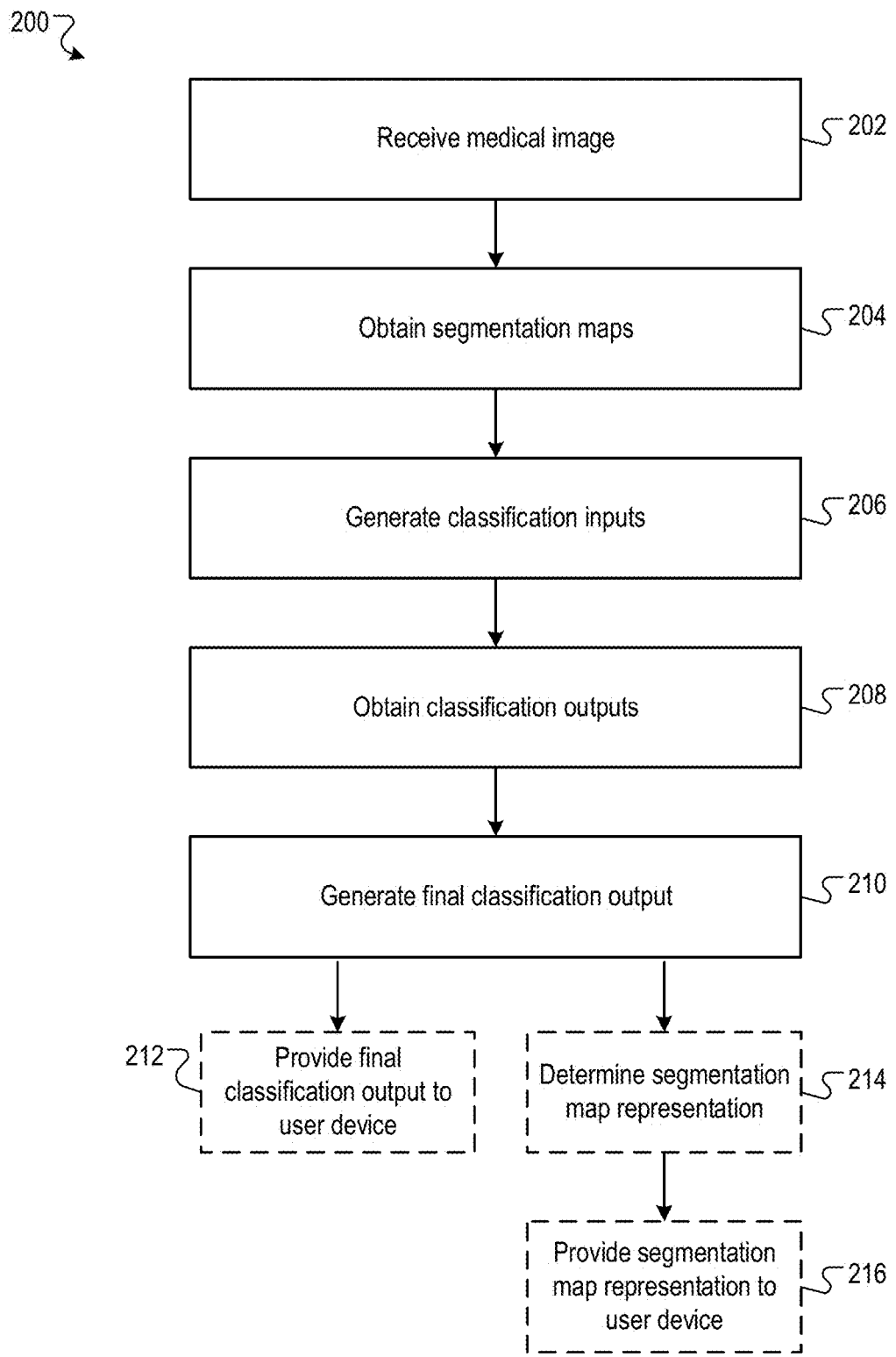
FIG. 2 is a flow diagram of an example process for determining a final classification output for a medical image.

FIG. 2 is a flow diagram of an example process 200 for determining a final classification output for a medical image. For convenience, the process 200 will be described as being performed by a system of one or more computers located in one or more locations. For example, a medical image processing system, e.g., the medical image processing system 100 of FIG. 1, appropriately programmed in accordance with this specification, can perform the process 200.

The system receives a medical image (202). The medical image depicts a region of the body of a patient, for example, the tissue of an eye, a breast, a prostate, a brain, or the whole body. The medical image may be a two-dimensional (2D) image (e.g., represented as a 2D array of pixels), a three dimensional (3D) image (e.g., represented as a 3D array of voxels), or a higher dimensional image. The medical image can be acquired by a medical image scanner of any modality, for example, an optical coherence tomography (OCT) scanner, a magnetic resonance imaging (MRI) scanner, an X-ray scanner, a computed tomography (CT) scanner, an ultrasound (US) scanner, or a photographic scanner. In a particular example, the medical image 102 may be a 3D OCT image (i.e., acquired by an OCT scanner) of one of the patient's eyes, where the intensity of each voxel indicates the reflection and absorption of light waves at a corresponding location in the eye tissue of the patient.

The system provides the medical image as an input to each of one or more segmentation neural networks to obtain one or more segmentation maps (204). Each segmentation neural network is configured to receive an input including the medical image and to process the input in accordance with current values of segmentation neural network parameters to generate a segmentation map. Each segmentation map characterizes a segmentation of the medical image into multiple different tissue types from a predetermined set of tissue types. In some implementations, each segmentation map assigns a respective tissue type from the predetermined set of tissue types to each voxel of the medical image. In some implementations, each segmentation map assigns a respective probability for each tissue type from the predetermined set of tissue types to each voxel of the medical image.

The system generates a respective classification input from each segmentation map (206). For example, the system may generate a classification input from a segmentation map by determining the classification input to be a down-sampled version of the segmentation map. Down-sampling a segmentation map refers to determining a lower resolution, more compact representation of the segmentation map (e.g., by retaining only a representative subset of the data in the segmentation map). As another example, the system may generate a classification input from a segmentation map by sampling a respective tissue type for each voxel of the medical image in accordance with a probability distribution over the tissue types for the voxel defined by the segmentation map. In this example, the classification input may include data defining the sampled tissue type for each voxel of the medical image. As another example, the system may generate a classification input from a segmentation map by selecting a respective tissue type for each voxel of the medical image as a tissue type with a highest probability according to a probability distribution over the tissue types for the voxel defined by the segmentation map. In this example, the classification input may include data defining the selected tissue type for each voxel of the medical image.

For each segmentation map, the system provides the classification input generated from the segmentation map as an input to each of one or more classification neural networks to obtain a respective classification output from each classification neural network (208). Each classification neural network is configured to receive an input including a classification input and, optionally, data defining characteristics of the patient (e.g., age, sex, visual acuity, or a clinical vignette). Each classification neural network is configured to process the input in accordance with current values of classification neural network parameters to generate a classification output (e.g., the classification outputs) characterizing the medical image.

In some implementations, the classification output generated using a classification neural network by processing a classification input determined from a segmentation map includes a respective referral score for each of multiple possible clinical referral decisions. Each referral score may represent a predicted likelihood that the corresponding referral decision is the most appropriate referral decision for the patient, conditioned on the segmentation map of the medical image of the patient. A clinical referral decision may reflect an urgency with which the patient should receive further medical attention (e.g., by a specialist physician). Examples of clinical referral decisions include: observation only, routine, semi-urgent, and urgent.

In some implementations, the classification output generated using a classification neural network by processing a classification input determined from a segmentation map includes a respective condition score for each of multiple medical conditions. Each condition score may represent a predicted likelihood that the patient has the medical condition, conditioned on the segmentation map of the medical image of the patient. For example, if the medical image is an OCT image of the patient's eye, then the medical conditions may include: normal condition, macular retinal edema (MRO), choroidal neovascularization (CNV), and geographic atrophy, amongst others.

In some implementations, the classification output generated using a classification neural network by processing a classification input determined from a segmentation map includes a respective progression score for each of multiple condition states. Each progression score may represent a predicted likelihood that a state of a corresponding medical condition will progress to the condition state at a particular future time, conditioned on the segmentation map of the medical image of the patient. For example, the condition states include: a stable state, a slow progression state, or a rapid progression state.

In some implementations, the classification output generated using a classification neural network by processing a classification input determined from a segmentation map includes a respective treatment score for each of multiple medical treatments. Each treatment score may represent a predicted likelihood that the medical treatment is the best medical treatment for the patient, conditioned on the segmentation map of the medical image of the patient. For example, the medical treatments may include: no treatment, surgery, or the administration of different drugs.

In some implementations, the classification output generated using a classification neural network by processing a classification input determined from a segmentation map includes multiple different types of scores (e.g., the previously described scores). For example, the classification output may include both referral scores and condition scores.

The system generates a final classification output for the medical image from the classification outputs (e.g., as obtained in 208) (210). For example, the system may determine the final classification output as an average of the classification outputs for each of the segmentation maps.

Optionally, the system can provide the final classification output to a user device (212). For example, the system can provide the final classification output for presentation on a display of a user device of a clinician, who may use the final classification output, for example, in assessing a medical condition of the patient and determining an appropriate referral.

Optionally, the system can determine a segmentation map representation (214). The system can determine the segmentation map representation based on at least one of the segmentation maps (i.e., as obtained in 204). For example, the system can determine a segmentation map representation which includes a two-dimensional thickness map representing a thickness of a particular tissue (e.g., as determined from the segmentation maps) overlaid on a projection of the medical image. As another example, the system can determine a segmentation map representation to be a 3D representation that differentiates between tissues of different types identified in the segmentation maps. The system can provide the segmentation map representation to a user device (216). For example, the system can provide the segmentation map representation for presentation on a display of a user device of a clinician, who may use the segmentation map representation, for example, in assessing a medical condition of the patient and determining an appropriate referral.

Figure 3:
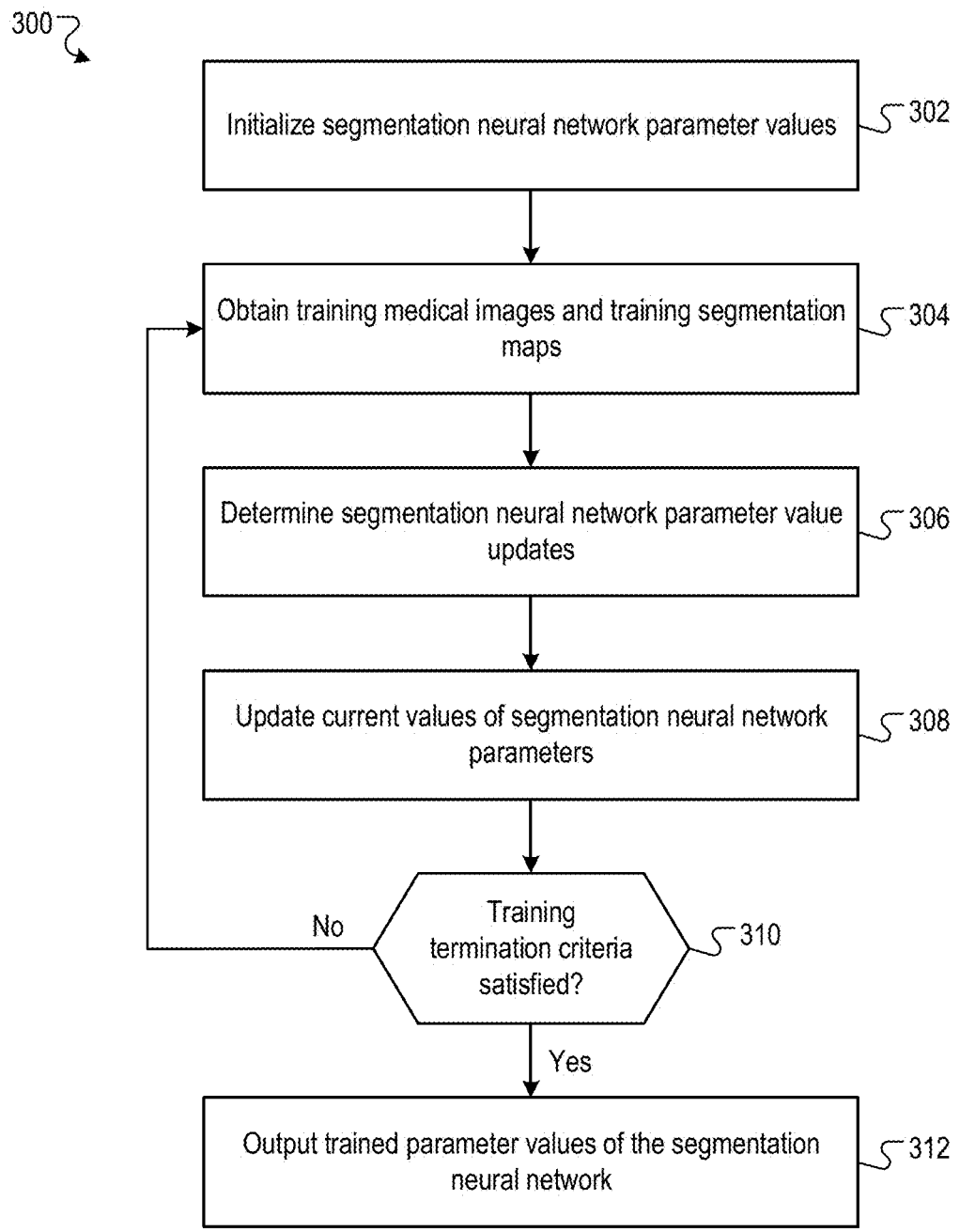
FIG. 3 is a flow diagram of an example process for training a segmentation neural network.

FIG. 3 is a flow diagram of an example process 300 for training a segmentation neural network. For convenience, the process 300 will be described as being performed by a system of one or more computers located in one or more locations. For example, a medical image processing system, e.g., the medical image processing system 100 of FIG. 1, appropriately programmed in accordance with this specification, can perform the process 300.

The system initializes the segmentation neural network parameter values (302). In some implementations, the system may initialize the segmentation neural network parameter values by sampling them from one or more probability distributions. In some implementations, the system may initialize the segmentation neural network parameter values based on trained parameter values of another neural network with the same architecture as the segmentation neural network and which has been trained to perform a different prediction (e.g., segmentation) task.

The system obtains one or more training examples, where each training example includes: (i) a training medical image, and (ii) a training segmentation map of the medical image (304). For example, the system may randomly sample the training examples from a set of training data including multiple training examples. The training segmentation map included in the training example is a segmentation map that should be generated by the system for the training medical image included in the training example. The training segmentation map may be generated by manual annotation of the training medical image by a medical expert (e.g., a specialist physician). Manual annotation refers to a process by which a person manually (i.e., by a non-automated or partially non-automated process) assigns a respective tissue type to each voxel of a training medical image. For brevity, the process 300 is described with reference to a particular training example from the one or more obtained training examples.

The system determines an update to the current parameter values of the segmentation neural network (306). More specifically, the system processes the training medical image using the segmentation neural network in accordance with current parameter values of the segmentation neural network to generate a segmentation map (e.g., as described with reference to 204). The system can determine the update to the current parameter values of the segmentation neural network by determining a gradient of a loss function with respect to the parameters of the segmentation neural network, where the loss function depends on: (i) the training segmentation map, and (ii) the segmentation map generated by the segmentation neural network. The loss function may be, for example, a per-voxel cross-entropy loss function. The system may compute the gradient using, for example, a backpropagation procedure.

The system updates the current parameter values of the segmentation neural network (308). For example, for a given segmentation neural network parameter θ, the system may update the current value of the segmentation neural network parameter by:

$$\theta \leftarrow \theta \alpha r \cdot \nabla \mathcal{L}_\theta \quad (1)$$

where ← is an assignment operator, r is a positive learning rate hyper-parameter (i.e., a hyper-parameter governing how much the value of the parameter θ can change in a training iteration), and $\nabla \mathcal{L}_\theta$ is the gradient of the loss function with respect to the parameter θ. As another example, the system may update the current value of the segmentation neural network parameter using the Adam stochastic optimization method described with reference to: D. Kingma, J. Ba, "A method for stochastic optimization", arXiv:1412.6980, 2014.

The system determines whether training termination criteria are satisfied (310). For example, the system may determine the training termination criteria are satisfied if the system has completed a pre-determined number of training iterations, or if the change in the value of the loss function between training iterations falls below a predetermined threshold. In response to determining that the training termination criteria are not met, the system returns to 304. In response to determining that the training termination criteria are met, the system outputs the trained parameter values of the segmentation neural network. For example, the system may store the trained parameter values (e.g., in a logical data storage area or physical data storage device) or use the trained parameter values in processing medical images to determine segmentation maps.

Figure 4:
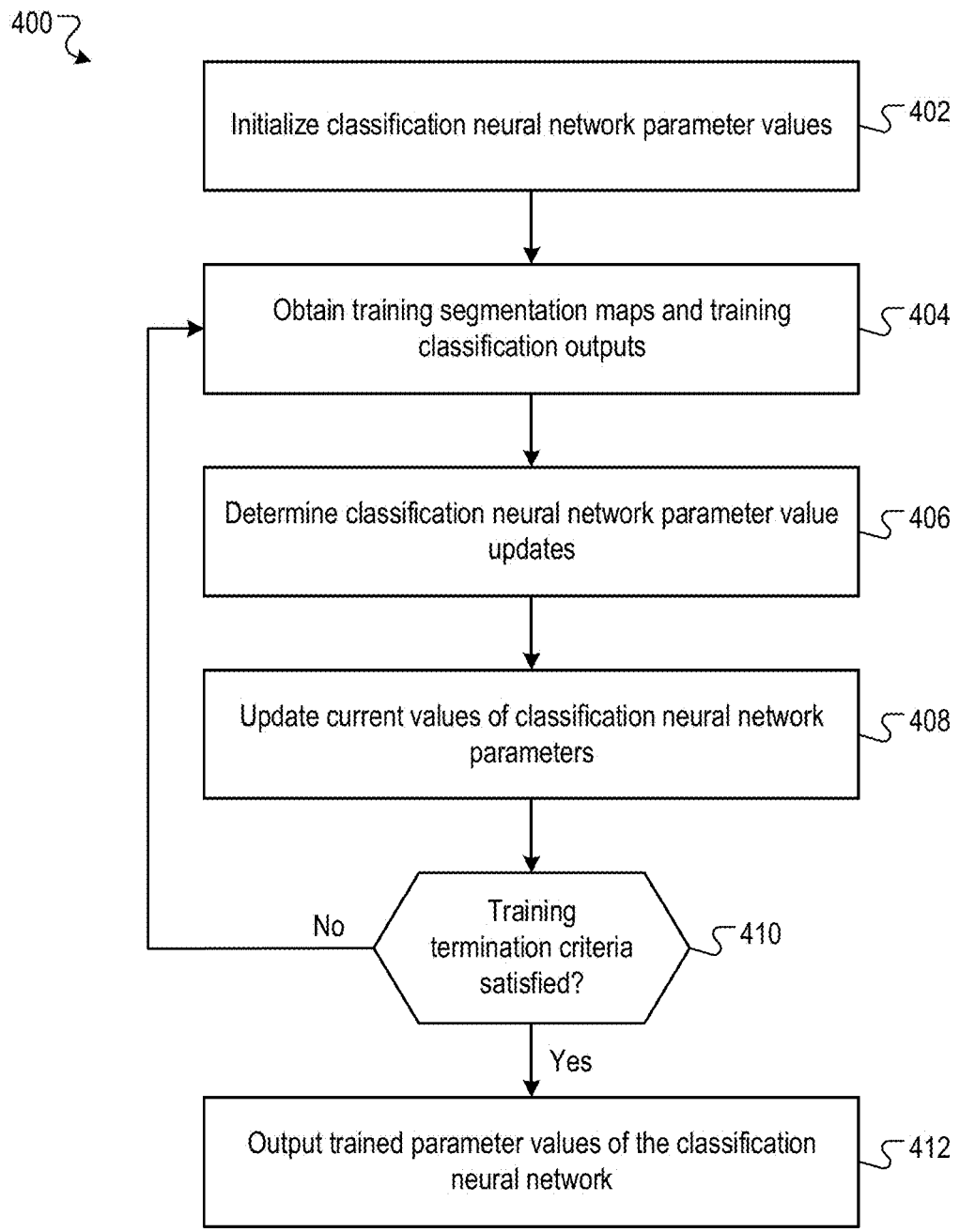
FIG. 4 is a flow diagram of an example process for training a classification neural network.

FIG. 4 is a flow diagram of an example process 400 for training a classification neural network. For convenience, the process 400 will be described as being performed by a system of one or more computers located in one or more locations. For example, a medical image processing system, e.g., the medical image processing system 100 of FIG. 1, appropriately programmed in accordance with this specification, can perform the process 400.

The system initializes the classification neural network parameter values (402). In some implementations, the system may initialize the classification neural network parameter values by sampling them from one or more probability distributions.

The system obtains one or more training examples, where each training example includes: (i) a training segmentation map of a medical image, and (ii) a training classification output. For example, the system may randomly sample the training examples from a set of training data including multiple training examples. In some implementations, the training segmentation map included in the training example is generated by manual annotation of the medical image by a medical expert. In some implementations, the training segmentation map is generated using a segmentation neural network (i.e., which processes the medical image). The training classification output included in the training example is a classification output that should be generated by the system for the training segmentation map. The training classification output may be determined based on patient clinical records. For example, if the classification output includes referral scores (as described earlier), then the training classification output can be determined by examining the patient's clinical record to determine a final medical diagnosis of the patient and the optimal referral in light of that (subsequently obtained) information.

The system determines an update to the current parameter values of the classification neural network (406). More specifically, the system generates a training classification input from the training segmentation map (e.g., as described with reference to 206) and processes the training classification input using the classification neural network in accordance with current parameter values of the classification neural network to generate a classification output (e.g., as described with reference to 208). The system can determine the update to the current parameter values of the classification neural network by determining a gradient of a loss function with respect to the parameters of the classification neural network, where the loss function depends on: (i) the training classification output, and (ii) the classification output generated by the classification neural network. The loss function may be, for example, a cross-entropy loss function. The system may compute the gradient using, for example, a backpropagation procedure.

In some cases, the loss function may incorporate different penalty values for each possible misclassification of each possible classification output. In a particular example, the classification outputs may be referral scores and the possible classification outputs may be "routine" and "urgent". In this example, the penalty values may include a first penalty value for generating a classification output indicating a "routine" referral when the training classification output is "urgent", and a second penalty value for generating a classification output indicating an "urgent" referral when the training classification output is "routine". By incorporating different penalty values, the loss function can reflect different costs associated with different kinds of misclassifications. The cost associated with a misclassification may reflect, for example, potential patient discomfort or unnecessary deterioration in the condition of the patient as a result of the misclassification.

The system updates the current parameter values of the classification neural network (408). An example process for updating the current parameter values of a neural network is described with reference to 308.

The system determines whether training termination criteria are satisfied (410). An example process for determine whether training termination criteria are satisfied is described with reference to 310. In response to determining the training criteria are not met, the system returns to 404. In response to determining that the training termination criteria are met, the system outputs the trained parameter values of the classification neural network. For example, the system may store the trained parameter values (e.g., in a logical data storage area or physical data storage device) or use the trained parameter values in processing classification inputs to determine classification outputs.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising one or more computers and one or more storage devices storing instructions that when executed by the one or more computers cause the one or more computers to implement:
   a first set of one or more segmentation neural networks, wherein each segmentation neural network in the first set is configured to:
      receive an input image of eye tissue captured using a first imaging modality; and
      process the input image to generate a segmentation map that segments the eye tissue in the input image into a plurality of tissue types;
   a set of one or more classification neural networks, wherein each classification neural network is configured to:
      receive a classification input comprising a segmentation map of eye tissue; and
      process the classification input to generate a classification output that characterizes the eye tissue; and
   a subsystem configured to:
      receive a first image of eye tissue captured using the first imaging modality, wherein the first image of eye tissue captured using the first modality is a three-dimensional image comprising a plurality of voxels;
      provide the first image as input to each of the segmentation neural networks in the first set to obtain one or more three-dimensional segmentation maps of the eye tissue in the first image, wherein each of the one or more three-dimensional segmentation maps assigns, to each of the voxels: (i) a respective tissue type from a predetermined set of tissue types, or (ii) a respective tissue type probability distribution over the predetermined set of tissue types;

generate, from each of the three-dimensional segmentation maps, a respective classification input that comprises the three-dimensional segmentation map; and provide, for each of the three-dimensional segmentation maps, the classification input for the three-dimensional segmentation map as input to each of the classification neural networks to obtain, for each three-dimensional segmentation map, a respective classification output from each classification neural network, wherein the classification outputs of the classification neural network characterize predicted global properties of the first image of the eye tissue; and generate, from the respective classification outputs for each of the three-dimensional segmentation maps, a final classification output for the first image.

2. The system of claim 1, wherein the first imaging modality is an Optical Coherence Tomography (OCT) scanner.

3. The system of claim 1, wherein the subsystem is further configured to:

provide a representation of at least one of the three-dimensional segmentation maps for presentation on a user device.

4. The system of claim 3, wherein the representation of the three-dimensional segmentation map includes, for each of the plurality of tissue types, a two-dimensional thickness map overlaid on a projection of the first image.

5. The system of claim 3, wherein the representation of the three-dimensional segmentation map includes a three-dimensional representation of the tissue that differentiates between tissue of different types as identified in the segmentation map.

6. The system of claim 1, wherein the classification input for a given three-dimensional segmentation map comprises a down-sampled version of the given three-dimensional segmentation map, and wherein generating, from each of the three-dimensional segmentation maps, a respective classification input comprises down-sampling the three-dimensional segmentation map to generate the classification input.

7. The system of claim 1, wherein the classification outputs that characterize predicted global properties of the first image of the eye tissue comprise a respective referral score for each of a plurality of referral decisions that represents a predicted likelihood that the referral decision is the most appropriate referral decision for a patient given a current state of the eye tissue.

8. The system of claim 7, wherein, when the set of classification neural networks includes a plurality of classification neural networks, generating the final classification output comprises combining the referral scores generated by the classification neural networks to generate a final referral score for each of the referral decisions that represents a final predicted likelihood that the referral decision is the most appropriate referral decision for the patient given the current state of the eye tissue.

9. The system of claim 1, wherein the classification outputs that characterize predicted global properties of the first image of the eye tissue comprise a respective condition score for each of one or more eye-related conditions that represents a predicted likelihood that a patient has the condition given a current state of the eye tissue.

10. The system of claim 9, wherein, when the set of classification neural networks includes a plurality of classification neural networks, generating the final classification output comprises combining the condition scores generated by the classification neural networks to generate a final condition score for each of the conditions that represents a final predicted likelihood that the patient has the condition.

11. The system of claim 1, wherein the classification outputs that characterize predicted global properties of the first image of the eye tissue comprise a respective progression score for each of one or more condition states that represents a predicted likelihood that a state of a corresponding eye-related condition will progress to the condition state at a particular future time given a current state of the eye tissue.

12. The system of claim 11, wherein, when the set of classification neural networks includes a plurality of classification neural networks, generating the final classification output comprises combining the progressions scores generated by the classification neural networks to generate a final progression score for each of the conditions that represents a final predicted likelihood that the state of a corresponding eye-related condition will progress to the condition state at the particular future time.

13. The system of claim 1, wherein the classification outputs that characterize predicted global properties of the first image of the eye tissue comprise a respective treatment score for each of a plurality of treatments that represents a predicted likelihood that the treatment is the best treatment for a patient given a current state of the eye tissue.

14. The system of claim 13, wherein, when the set of classification neural networks includes a plurality of classification neural networks, generating the final classification output comprises combining the treatment scores generated by the classification neural networks to generate a final treatment score for each of the treatments that represents a final predicted likelihood that that the treatment is the best treatment for the patient.

15. The system of claim 1, wherein the first set of segmentation neural networks comprises a plurality of segmentation neural networks, and wherein each segmentation neural network in the first set has the same architecture but has been trained (i) on differently permuted training images, (ii) with differently initialized parameters, or (iii) both, from each other segmentation neural network in the first set.

16. The system of claim 1, wherein first set of classification neural networks comprises a plurality of classification neural networks, and wherein each classification neural network in the first set has the same architecture but has been trained (i) on differently permuted training classification inputs, (ii) with differently initialized parameters, or (iii) both from each other classification neural network in the set.

17. The system of claim 1, wherein the subsystem is further configured to:

provide the final classification output for presentation on a user device.

18. One or more non-transitory computer storage media storing instructions that when executed by one or more computers cause the one or more computers to perform operations comprising:

receiving a first image of eye tissue captured using a first imaging modality, wherein the first image of eye tissue captured using the first modality is a three-dimensional image comprising a plurality of voxels;

providing the first image as input to each of one or more segmentation neural networks to obtain one or more three-dimensional segmentation maps of the eye tissue in the first image, wherein each of the one or more three-dimensional segmentation maps assigns, to each of the voxels: (i) a respective tissue type from a predetermined set of tissue types, or (ii) a respective tissue type probability distribution over the predetermined set of tissue types, wherein each segmentation neural network in the first set is configured to:
  receive an input image of eye tissue captured using the first imaging modality; and
  process the input image to generate a three-dimensional segmentation map that segments the eye tissue in the input image into a plurality of tissue types;
generating, from each of the three-dimensional segmentation maps, a respective classification input that comprises the three-dimensional segmentation map;
providing, for each of the three-dimensional segmentation maps, the classification input for the three-dimensional segmentation map as input to each of one or more classification neural networks to obtain, for each three-dimensional segmentation map, a respective classification output from each classification neural network, wherein each classification neural network is configured to:
  receive a classification input derived from a three-dimensional segmentation map of eye tissue; and
  process the classification input to generate a classification output that characterizes predicted global properties of the first image of the eye tissue; and
generating, from the respective classification outputs for each of the three-dimensional segmentation maps, a final classification output for the first image.

19. A method performed by one or more data processing apparatus, the method comprising:
receiving a first image of eye tissue captured using a first imaging modality, wherein the first image of eye tissue captured using the first modality is a three-dimensional image comprising a plurality of voxels;
providing the first image as input to each of one or more segmentation neural networks to obtain one or more three-dimensional segmentation maps of the eye tissue in the first image, wherein each of the one or more three-dimensional segmentation maps assigns, to each of the voxels: (i) a respective tissue type from a predetermined set of tissue types, or iii) a respective tissue type probability distribution over the predetermined set of tissue types, wherein each segmentation neural network in the first set is configured to:
  receive an input image of eye tissue captured using the first imaging modality; and
  process the input image to generate a three-dimensional segmentation map that segments the eye tissue in the input image into a plurality of tissue types;
generating, from each of the three-dimensional segmentation maps, a respective classification input that comprises the segmentation map;
providing, for each of the three-dimensional segmentation maps, the classification input for the three-dimensional segmentation map as input to each of one or more classification neural networks to obtain, for each three-dimensional segmentation map, a respective classification output from each classification neural network, wherein each classification neural network is configured to:
  receive a classification input derived from a three-dimensional segmentation map of eye tissue; and
  process the classification input to generate a classification output that characterizes predicted global properties of the first image of the eye tissue; and
generating, from the respective classification outputs for each of the three-dimensional segmentation maps, a final classification output for the first image.

\* \* \* \* \*